US008131797B2

(12) United States Patent
Joo et al.

(10) Patent No.: US 8,131,797 B2
(45) Date of Patent: Mar. 6, 2012

(54) SYSTEM AND METHOD FOR PROVIDING AND DISTRIBUTING GAME ON NETWORK

(75) Inventors: Seongyoun Joo, Songpa-gu (KR); Younhee Kim, Yongin-Si (KR)

(73) Assignee: NHN Corporation, Seongnam-si (KR)

( * ) Notice: Subject to any disclaimer, the term of this patent is extended or adjusted under 35 U.S.C. 154(b) by 868 days.

(21) Appl. No.: 12/215,786

(22) Filed: Jun. 30, 2008

(65) Prior Publication Data

US 2009/0005174 A1 Jan. 1, 2009

(30) Foreign Application Priority Data

Jun. 29, 2007 (KR) ........................ 10-2007-0065786

(51) Int. Cl.
*G06F 15/16* (2006.01)
*G06F 17/00* (2006.01)

(52) U.S. Cl. ............. 709/201; 709/206; 463/42; 463/43

(58) Field of Classification Search .................. 709/201, 709/206; 463/42, 43
See application file for complete search history.

(56) References Cited

U.S. PATENT DOCUMENTS 6,908,389 B1 * 6/2005 Puskala .......................... 463/40
7,147,563 B2 * 12/2006 Miura et al. .................... 463/42
7,682,243 B2 * 3/2010 Kim ................................ 463/23
7,887,416 B2 * 2/2011 Katsume et al. ................ 463/29
7,896,745 B2 * 3/2011 Youm ............................. 463/43
2002/0165024 A1 * 11/2002 Puskala .......................... 463/40
2002/0183045 A1 * 12/2002 Emmerson et al. ........... 455/412
2004/0048668 A1 * 3/2004 Brosnan .......................... 463/42
2006/0178216 A1 * 8/2006 Shea et al. ...................... 463/42
2006/0282304 A1 * 12/2006 Bedard et al. .................. 705/10
2007/0032300 A1 2/2007 Yang
2007/0049371 A1 3/2007 Yang
2007/0060374 A1 * 3/2007 Youm et al. ..................... 463/42
2007/0105627 A1 * 5/2007 Campbell ....................... 463/40
2007/0111799 A1 * 5/2007 Robb et al. ...................... 463/42
2007/0117635 A1 * 5/2007 Spanton et al. ................. 463/43
2007/0184905 A1 * 8/2007 Gatto et al. ..................... 463/42
2007/0197296 A1 * 8/2007 Lee ................................ 463/42
2007/0202941 A1 * 8/2007 Miltenberger et al. ......... 463/25
2007/0207859 A1 * 9/2007 Kim ................................ 463/42
2007/0218984 A1 * 9/2007 Yang .............................. 463/29
2007/0232396 A1 * 10/2007 Yoo ................................ 463/42
2007/0254741 A1 * 11/2007 Lim et al. ........................ 463/42

(Continued)

FOREIGN PATENT DOCUMENTS

JP 2007-038011 2/2007

(Continued)

*Primary Examiner* — Alina N. Boutah

(74) *Attorney, Agent, or Firm* — H.C. Park & Associates, PLC

(57) ABSTRACT

A system and a method for providing and distributing a game widely on a network are disclosed. The method includes: creating and storing game platform data which load a game to be distributed; providing a copy function that allows source address information of a game platform, corresponding to the game to be distributed, to be copied; downloading the game platform data in response to a request for the game platform from a client using the source address information of the game platform; and downloading the game to be distributed and additional information in response to an activation of the downloaded game platform data, wherein the game platform provides the copy function that allows the source address information of the game platform to be copied in response to a request from the client.

18 Claims, 9 Drawing Sheets

U.S. PATENT DOCUMENTS

2007/0265067 A1* 11/2007 Jiao et al. .......................... 463/29
2007/0294088 A1* 12/2007 Thelen et al. ...................... 705/1
2007/0294175 A1* 12/2007 Thelen ............................. 705/52
2008/0045340 A1* 2/2008 Kim ................................. 463/42
2008/0102959 A1* 5/2008 Hwang et al. .................... 463/42
2008/0113812 A1* 5/2008 Kwon .............................. 463/42
2008/0194309 A1* 8/2008 Youm .............................. 463/13
2008/0274803 A1* 11/2008 Yang ............................... 463/29
2008/0318685 A9* 12/2008 Oak et al. ......................... 463/42
2009/0017913 A1* 1/2009 Bell et al. ......................... 463/40
2009/0082113 A1* 3/2009 Kim et al. ........................ 463/42
2009/0298576 A1* 12/2009 Nguyen ........................... 463/25

FOREIGN PATENT DOCUMENTS

KR 1020070023156 2/2007
KR 1020070023157 2/2007

* cited by examiner

SYSTEM AND METHOD FOR PROVIDING AND DISTRIBUTING GAME ON NETWORK

CROSS-REFERENCE TO RELATED APPLICATION

This application claims the benefit of Korean Patent Application No. 10-2007-0065786, filed on Jun. 29, 2007, the entire disclosure of which is incorporated herein by reference.

TECHNICAL FIELD

The present disclosure relates to a system and a method for providing and distributing games via network.

BACKGROUND ART

Recently, the game industry has been developed as a data process model or an online business model, and the game related technology has been developed as well.

FIG. 1 is a schematic diagram showing a general online game system.

The general online game includes a plurality of clients 10, 11 and 12 and a game system 20. The game system 20 includes a game server 21 and a database server 22. The game server 21 can provide the clients 10, 11 and 12 with game data through a network, and the database server 22 stores game programs, game data and user information data.

The clients 10, 11 and 12 can download a client program for running an online game, and then play the game through the program. The game server 21 is provided with a game contents program which processes membership registration, game data process, game data statistics and user data for running the game.

Recently, many flash games are being developed. The flash game can provide various effects online due to a fast processing speed and a low load by using the Flash animation software. Since it is easy and takes little time to produce the flash game, social issues or trends can be quickly reflected therein.

Further, since the flash game can be easily embedded in a web page by using game source address information, a user can be easily brought into contact with the game and play the game while surfing the web.

Meanwhile, a service, which commercially provides the user with a highly entertaining game, is being actively provided to the user as well. In such case, a technique of hiding source information to prohibit a random access to the game source, thereby protecting copyrights and preventing illegal traffics.

However, such technique for protecting the commercial flash game source may work as a disadvantage to the flash game. In other words, the technique prevents the flash game from being easily distributed on the web.

Recently, a highly profitable method of marketing (i.e., "viral marketing") has been proposed, in which advertisement effect can be maximized by the distribution of certain contents through self-replicating viral process.

There is thus a need for a new a game system that can simultaneously protect the game source and exhibit the effect of the viral marketing.

The above information disclosed in this Background Art section is only for enhancement of understanding of the background of the invention and therefore it may contain information that does not form the prior art that is already known in this country to a person of ordinary skill in the art.

BRIEF SUMMARY OF THE DISCLOSURE

In view of the foregoing, the present disclosure provides a system and a method for providing and distributing games via viral marketing.

The present disclosure also provides a system and a method for providing online games and advertising the games and manufacturers thereof while protecting game sources.

The present disclosure also provides a system and a method for providing and distributing online games with additional information or advertisement.

In accordance with a first aspect of the present invention, there is provided a system for providing and distributing a game, including: a game server for providing at least one game content to a connected client; a game platform address generating unit for generating a network address of a game platform which loads a game to be distributed; a database server for storing data of the game platform, data of the game to be distributed and additional information provided by the game platform; and a request unit for requesting the data of the game to be distributed and the additional information to the database server in response to a request from the game platform installed in the client, wherein the client is allowed to copy the network address of the game platform through the game server or the game platform.

The additional information may include related game information or advertisement information.

Further, the game platform address is provided in an html tag format, and when a document including the html tag is activated on a web, the game platform requests the data for the game to be distributed and the additional information.

In accordance with a second aspect of the present invention, there is provided a method for providing and distributing a game, including: creating and storing game platform data which load a game to be distributed; providing a copy function that allows source address information of a game platform, corresponding to the game to be distributed, to be copied; downloading the game platform data in response to a request for the game platform from a client using the source address information of the game platform; and downloading the game to be distributed and additional information in response to an activation of the downloaded game platform data, wherein the game platform provides the copy function that allows the source address information of the game platform to be copied in response to a request from the client.

The step of creating and storing the game platform data includes: creating data for the game to be distributed; matching the game to be distributed with a related game; matching the game to be distributed with advertisement information data; creating the source address information of the game platform; and creating the game platform data providing the data for the game to be distributed, the related game, the advertisement information data and the source address information of the game platform.

In accordance with a third aspect of the present invention, there is provided a computer readable storage medium storing therein a data structure for a game platform for providing and distributing a game, the data structure comprising: game platform skin data for designing an outer appearance of the game platform; source address data for a game to be distributed which is loaded on the game platform; related game link data for displaying link information of a game related to the game to be distributed; advertisement information data; and game platform source address information data.

The above and other features of the invention are discussed infra.

BRIEF DESCRIPTION OF THE DRAWINGS

The above and other features and advantages of the present invention will become readily apparent by reference to the following detailed description when considered in conjunction with the accompanying drawings wherein.

DETAILED DESCRIPTION

Figure 1:
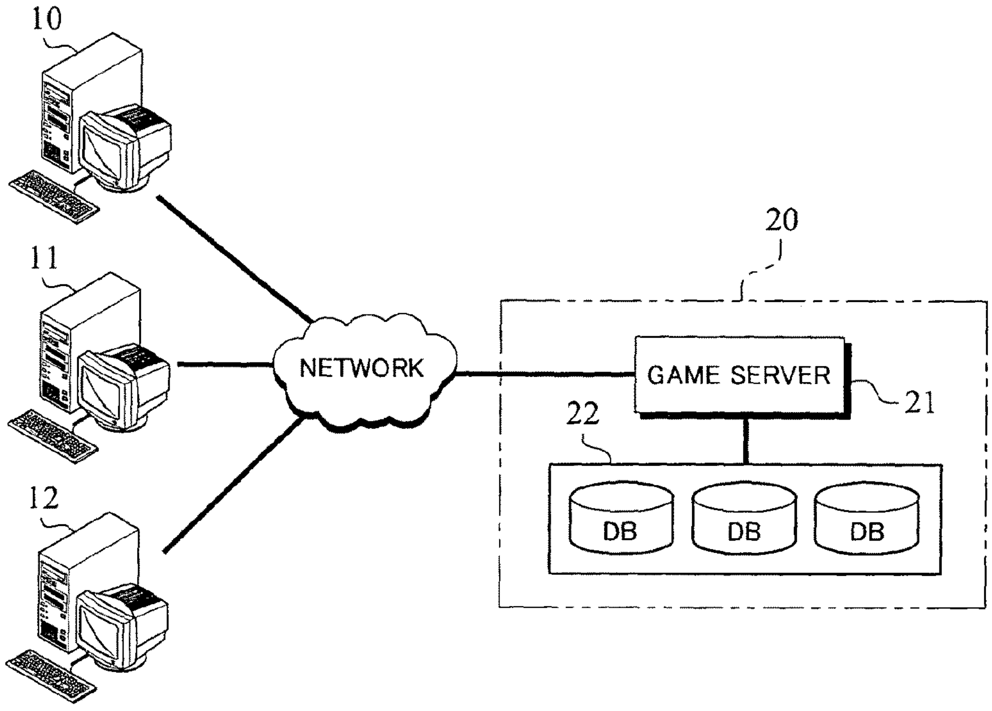
FIG. 1 (PRIOR ART)
FIG. 1 is a schematic diagram showing a general online game system.

Hereinafter, embodiments of the present invention will be described in detail with reference to the accompanying drawings so that the present invention may be readily implemented by those skilled in the art. However, it is to be noted that the present invention is not limited to the embodiments but can be realized in various other ways. In the drawings, parts irrelevant to the description are omitted for the simplicity of explanation, and like reference numerals denote like parts through the whole document.

Through the whole document, the term "connected to" or "coupled to" that is used to designate a connection or coupling of one element to another element includes both a case that an element is "directly connected or coupled to" another element and a case that an element is "electronically connected or coupled to" another element via still another element. Further, the term "comprises or includes" and/or "comprising or including" used in the document means that one or more other components, steps, operation and/or existence or addition of elements are not excluded in addition to the described components, steps, operation and/or elements.

The term "game platform" used in the present disclosure refers to a platform on which a flash game can be loaded. It can be embedded in a web page, and also can provide a related game link, a recommended game link, a game platform source address and the like.

The term "game to be distributed" used in the present disclosure refers to a game which can be played by being loaded through the game platform. It includes both a trial version game, in which functions, levels, stages or the like are limited, and an original version game, which does not have those limits.

Figure 2:
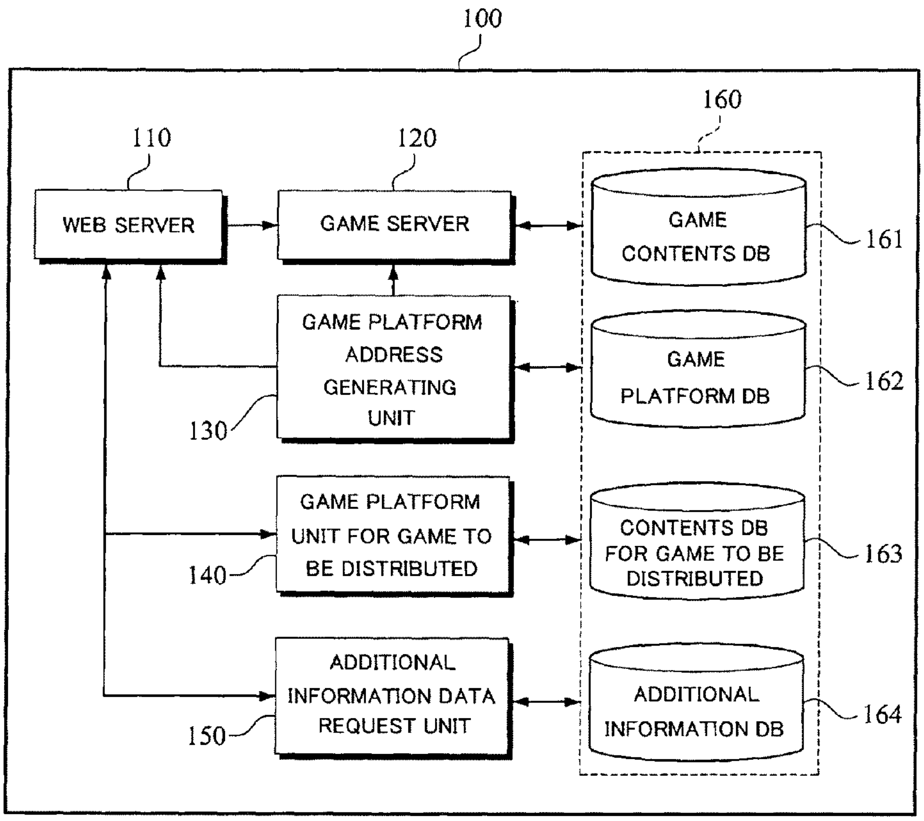
FIG. 2 is a block diagram showing components of a system for providing a game in accordance with an embodiment of the present invention.

FIG. 2 is a block diagram showing components of a system for providing a game in accordance with an embodiment of the present invention.

A game providing system 100 includes a web server 110, a game server 120, a game platform address generating unit 130, a data request unit 140 for a game to be distributed, an additional information data request unit 150 and a database server 160. Here, the database server 160 includes a game contents database 161, a game platform database 162, a contents database 163 for a game to be distributed and an additional information database 164.

The web server 110 provides a web page so that a game user can join membership, register and login. Further, the web server 110 provides a game through a specific webpage, or provides a connection with the game server 120.

The game server 120 requests game contents stored in the game contents database 161 to provide the game contents to a client connected to the game providing system 100. The game server 120 can provide the game contents directly or via the web server 110.

The game platform address generating unit 130 generates an address of a game platform on a network, in which the game platform can provide a game to be distributed for each game. The game platform address is written in an html format such as an <object> or <embed> tag, and is used for embedding the game platform on the web page. Here, the game platform address can be generated differently depending on the game to be distributed. The game platform address can be copied through the game server which provides an original version, or the game platform can provide a copy function relative to the game platform address.

The game platform database 162 stores game platform data of each game. For example, the game platform data for loading a brick-breaking game may be different from the game platform data for loading a puzzle game.

The data request unit 140 requests data for the game to be distributed from the contents database 163 to provide the data to the game platform. The request for the data can be performed by the client when the game platform is activated on the web page. In other words, the game platform data have source address information on the data, and load the game to be distributed online by using the source address information.

The additional information database 164 is stored with various kinds of additional information provided by the game platform. The additional information may include link information and advertisement information of related games.

The additional information data request unit 150 requests additional information data from the additional information database 164. The request for the additional information can also be performed by the client when the game platform is activated on the web page. In other words, the game platform data have information of the additional information data, and provide the additional information online by using the additional information data.

Meanwhile, the additional information data can be dynamically updated by periodically changing the data of the additional information database 164 while maintaining access address information.

Figure 3:
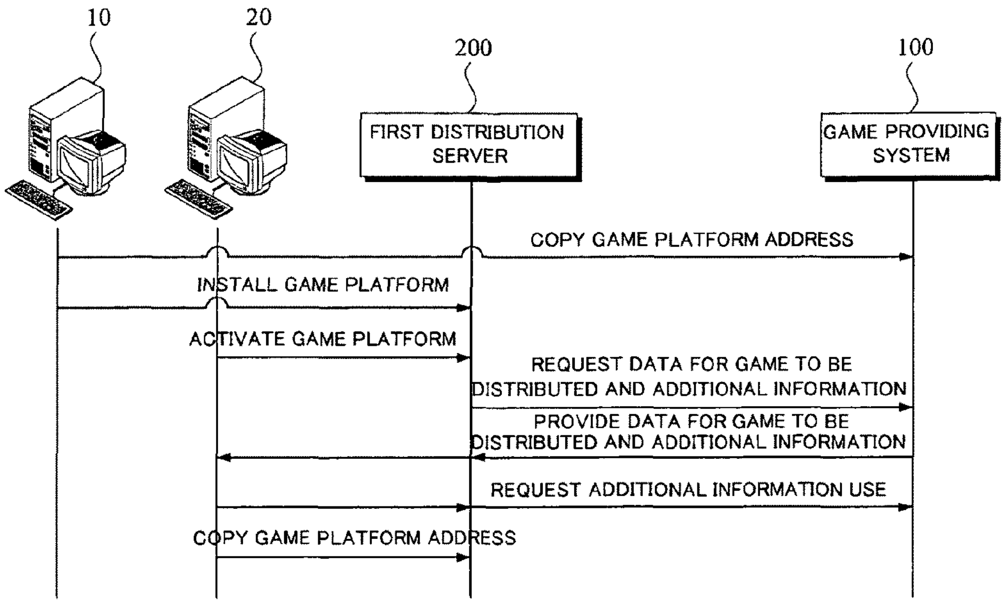
FIG. 3 shows an operation of a system for providing a game in accordance with an embodiment of the present invention.

Hereinafter, an online operation of a game providing system will be described in detail with reference to FIG. 3.

A first user client 10 connects to a game providing system 100, and then copy a game platform address of a game which a user desires to distribute. The game platform address is created in an <object> or <embed> tag format so that it can be inserted into an html document of an article.

The first user client 10 installs a game platform on an article of a first distribution server 200, where the user desires to install the game platform.

After that, if a second user client 20 visits the first distribution server 200 and opens a web page of the article, the game platform is activated. Particularly, the game platform is downloaded to the second user client 20 through the first distribution server 200, and the game platform requests data for a game to be distributed and additional information to the game providing system 100.

In response to the request, the game providing system 100 provides the data and the additional information to the second client 20. Though the first distribution server 200 provides an online space which exposes the game platform, the above-mentioned series of operations can be performed by a direct data transmission/reception between the second client 20 and the game providing system 100 after the game platform is exposed.

If the game to be distributed is loaded on the game platform, the second user client 20 plays the game through the game platform. If the second user client desires to use the additional information provided from the game platform, a usage of the additional information can be requested from the game providing system 100 by using a command such as a clicking operation or the like.

For example, the game platform may include original version link information or related recommended game link information of the game to be distributed. Thus, if the second user client 20 desires to further use the additional information, the game providing system 100 can guide the second user client 20 to be connected with its game server.

Thereafter, the second user client 20 can create an article on a second distribution server (not shown) by copying the source address information of the game platform of the game to be distributed. Since an operation performed afterward is the same as the above-mentioned operation, a detailed description thereof is omitted.

When the game is repeatedly provided to another user client, the game to be distributed can be widely distributed through a network effect. Accordingly, the number of users will also increase.

In case of a popular game to be distributed, the distribution speed will increase even more. Therefore, an operator of the game providing system 100 can widely distribute and advertise the game through the operation by the client without putting any efforts, so that the effect of the viral marketing can be achieved.

Figure 4:
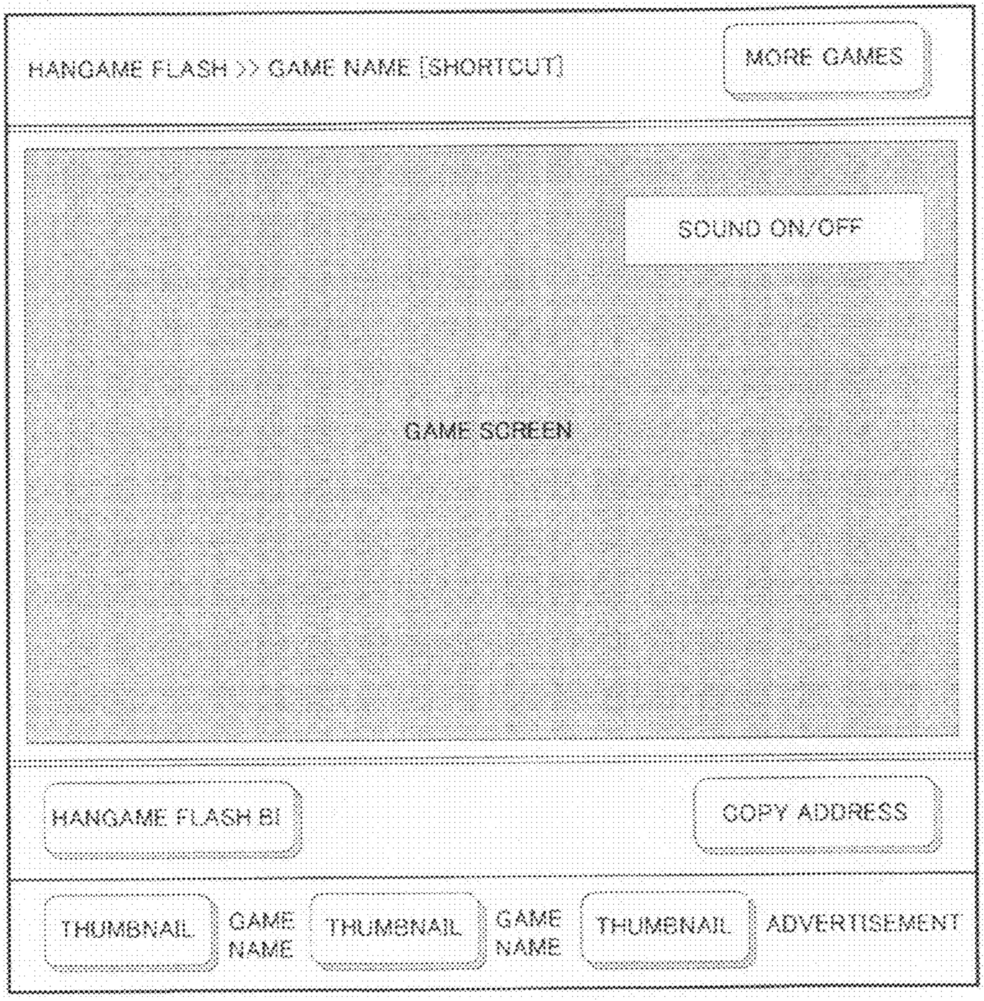
FIG. 4 is a diagram showing components of a game platform in accordance with an embodiment of the present invention.

FIG. 4 is a diagram showing components of a game platform in accordance with an embodiment of the present invention.

The game platform displays a name of a game providing system and the like at the top thereof, and link information of the game providing system can be inserted therein. Further, the game platform displays a name of a game to be distributed, and provides a moving function to a place which provides an original version of the game to be distributed by using a "shortcut" link.

In addition, the game platform provides a moving function to a recommended game list or a game list page of the game providing system by using a link connected to "more games."

The game to be distributed is loaded on a game screen, and a user can play the game in the game platform.

Further, a logo of the game providing system such as "Hangame Flash BI" or the like can be inserted, and a link leading to another site operated by the game providing system can be inserted as well.

Link information, which can lead a user to a game having a genre similar as the game to be distributed, a recommended game or a popular game, can be provided together with a thumbnail showing an image of the corresponding game on the bottom of the game platform. Thus, the user can move to the site of the game providing system which provides a related game by clicking the thumbnail. In this manner, not only the game is distributed, but also the user can be continuously introduced into the game providing system which provides the game platform.

Furthermore, the thumbnail may include an advertisement image and/or link information that leads to a detailed page of the advertisement.

A "copy address" button provides a function of copying source address information of the game platform where the game to be distributed is loaded.

Figure 5:
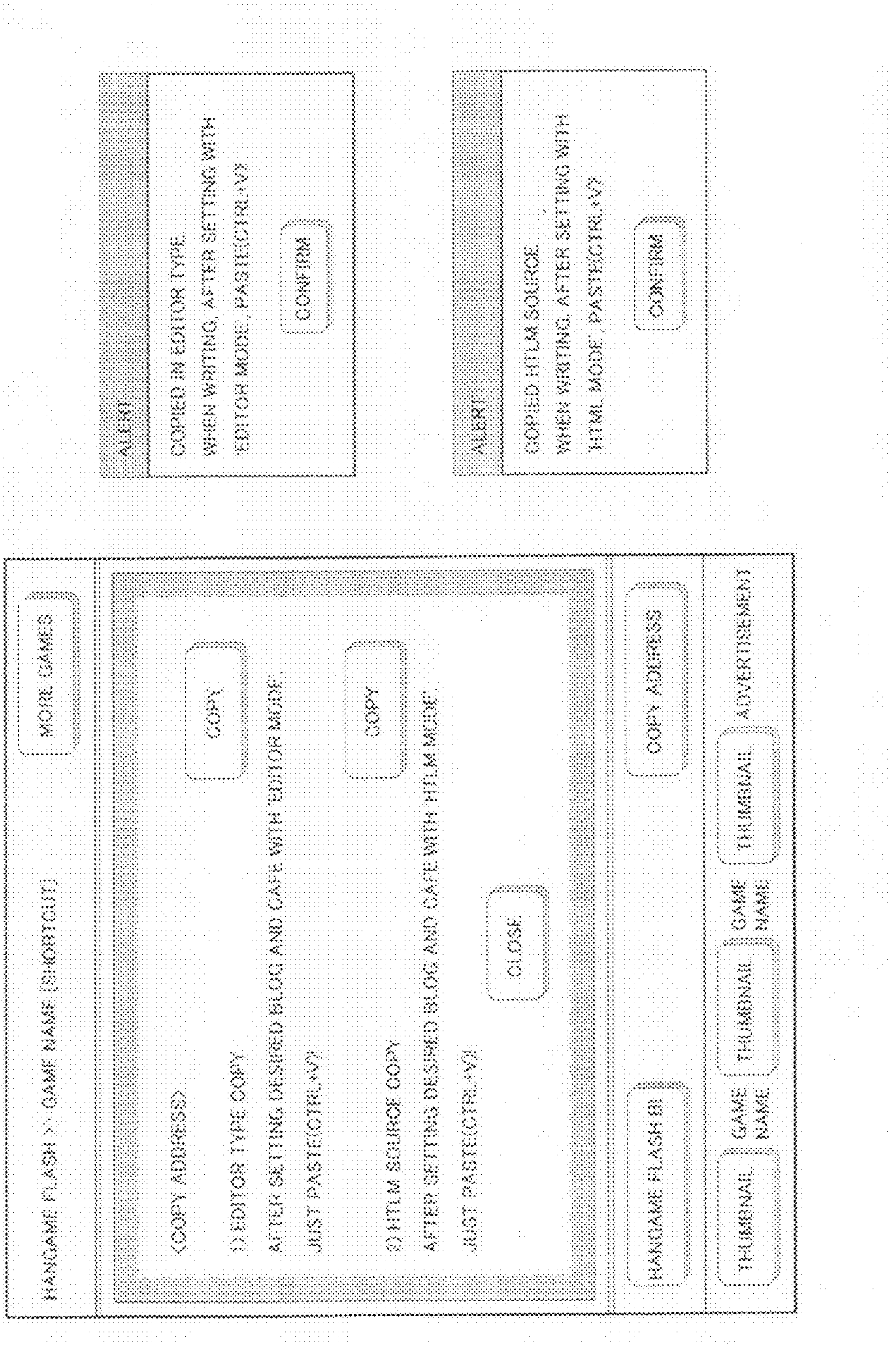
FIG. 5 is a diagram explaining an operation of copying from a game platform in accordance with an embodiment of the present invention.

FIG. 5 is a diagram explaining an operation of copying from a game platform in accordance with an embodiment of the present invention.

If the "copy address" button is clicked, the screen is changed to a screen which allows source address information of the game platform to be copied according to formats. The source address information of the game platform can be URL address information about source data of the game platform, or can be an <object> or <embed> tag, which is inserted into an html document and requested from a blog, an internet community or the like.

Furthermore, not only the game platform source address information can be direct address information of the game platform source data, but also can provide a web program address, which requests a game platform source data file from the game providing system, in a URL format.

As described above, the game platform can be copied while an original version game is running in the site of the game providing system. In this case, if a copy address button, which performs the same operation as the copy address button shown in FIG. 5, is provided in the original version game, the game platform can be copied while the original version game is played. In other words, if the copy address button is clicked, the game platform source address information is copied, and the copied information can be inserted into a desired article by using a common pasting command (Ctrl+V).

Figure 6:
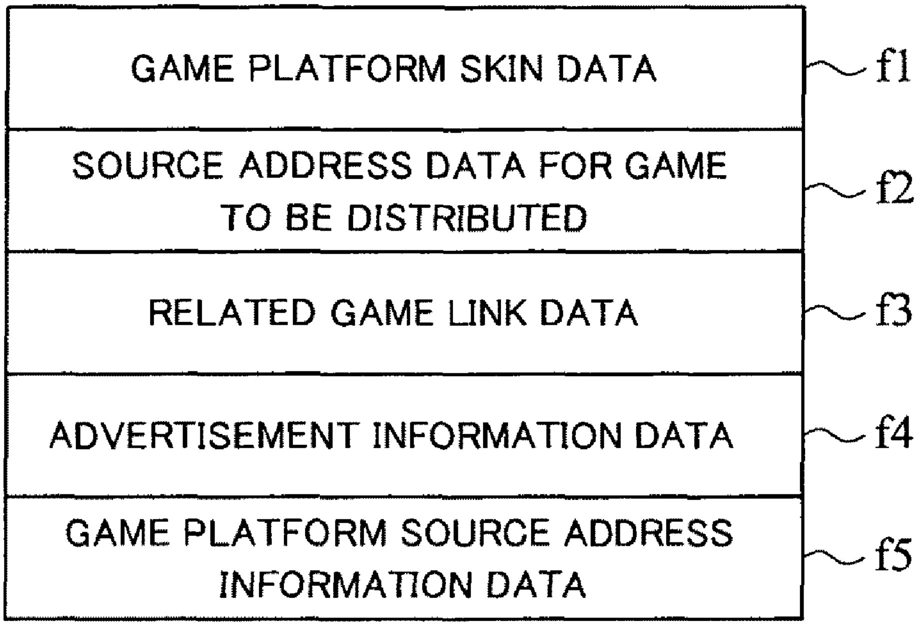
FIG. 6 is a diagram showing a structure of game platform data in accordance with an embodiment of the present invention.

FIG. 6 is a diagram showing a structure of game platform data in accordance with an embodiment of the present invention.

Game platform data include game platform skin data f1, source address data f2 for a game to be distributed, related game link data f3, advertisement information data f4 and game platform source address information data f5.

The game platform skin data (f1) are data for an appearance of a game platform, such as a design of the game platform and an arrangement of a game screen, a BI, a thumbnail of a recommended game or the like.

The source address data (f2) are data regarding an address for making an access to the game to be distributed. Thus, if the game platform is installed, the game to be distributed is loaded onto the game screen based on the source address data f2 of the game platform. With such structure, the source address for the game to be distributed can be prevented from being exposed, and various contents can be provided to the game platform by using the game platform address information having a short length.

The related game link data (f3) are link information about games related to the game to be distributed, for example, the original version of the game to be distributed, a game of a similar genre, a recent popular game or the like. By using the related game link data f3, the users who installed the game platform can be introduced into the site of the game providing system.

The advertisement information data (f4) include various advertisement images or link information of an advertisement page.

The game platform source address information data (f5) include an URL, which allows an access to sources of the corresponding game platform, or html tag information. The game platform source address information data (f5) provide a copy function to the client by using the copy address button shown in FIG. 5.

The game platform is freely distributed online through such platform data structure, and the game platform is widely distributed by using the copy address function. With the above-described structure, the game platform can be provided in a flash file (swf) format, and the game platform can load the game to be distributed thereon and request the additional information online.

Meanwhile, it is apparent to those skilled in the art that the game platform is not limited to a single file having an outer appearance of a platform design but also includes a program or a web program, which has a random format, providing the data structure shown in FIG. 6 to the client.

Figure 7:
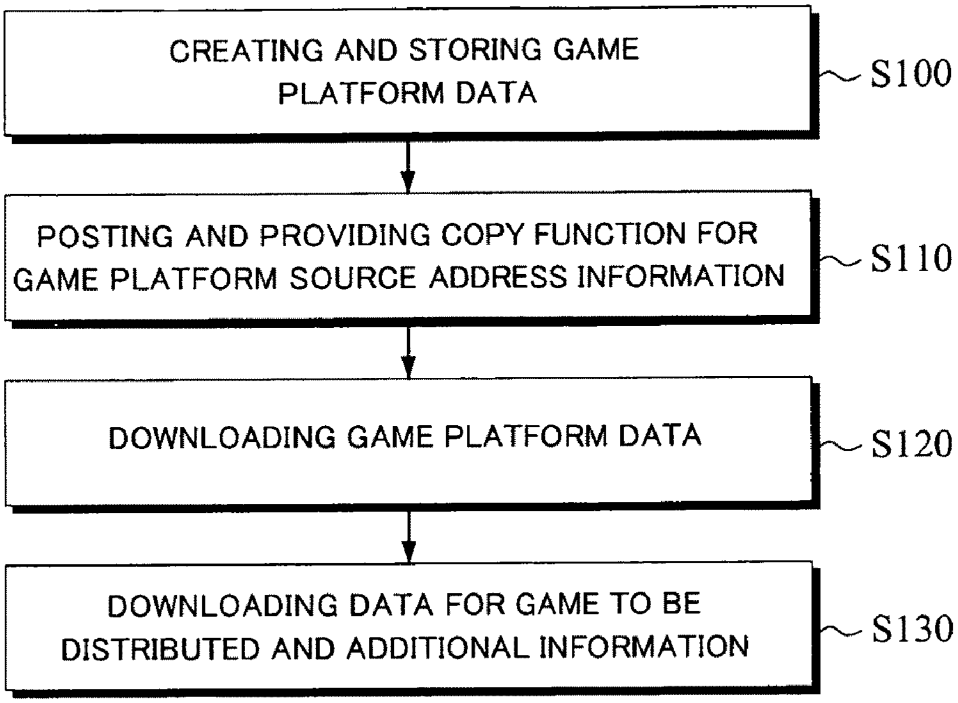
FIG. 7 is a flowchart showing a method for providing a game in accordance with an embodiment of the present invention.

FIG. 7 is a flowchart showing a method for providing a game in accordance with an embodiment of the present invention.

Game platform data for a game to be distributed are created and stored (step S100). The game platform data include, as described above, a game platform skin, data source address data for a game to be distributed, additional information data and game platform source address information.

In step S110, the game platform source address information is provided or allowed to be copied. Assuming that a game platform is not distributed at all yet, the game platform source address information can be provided through a web page provided by a web server of the game providing system or a game program provided by a game server.

Afterwards, the game platform source address information is copied by a client connected to the game providing system, and if the game platform is requested through a random web page by using the address information, the game platform data are downloaded to the client (step S120).

The game platform data activate the game platform on a web browser, and at the same time, request a data for the game to be distributed and additional information by using an algorithm and information data included in the game platform data. In response to the request, the data for the game to be distributed and the additional information are downloaded (step S130). The downloaded data for the game to be distributed are loaded on a game screen of the game platform.

Figure 8:
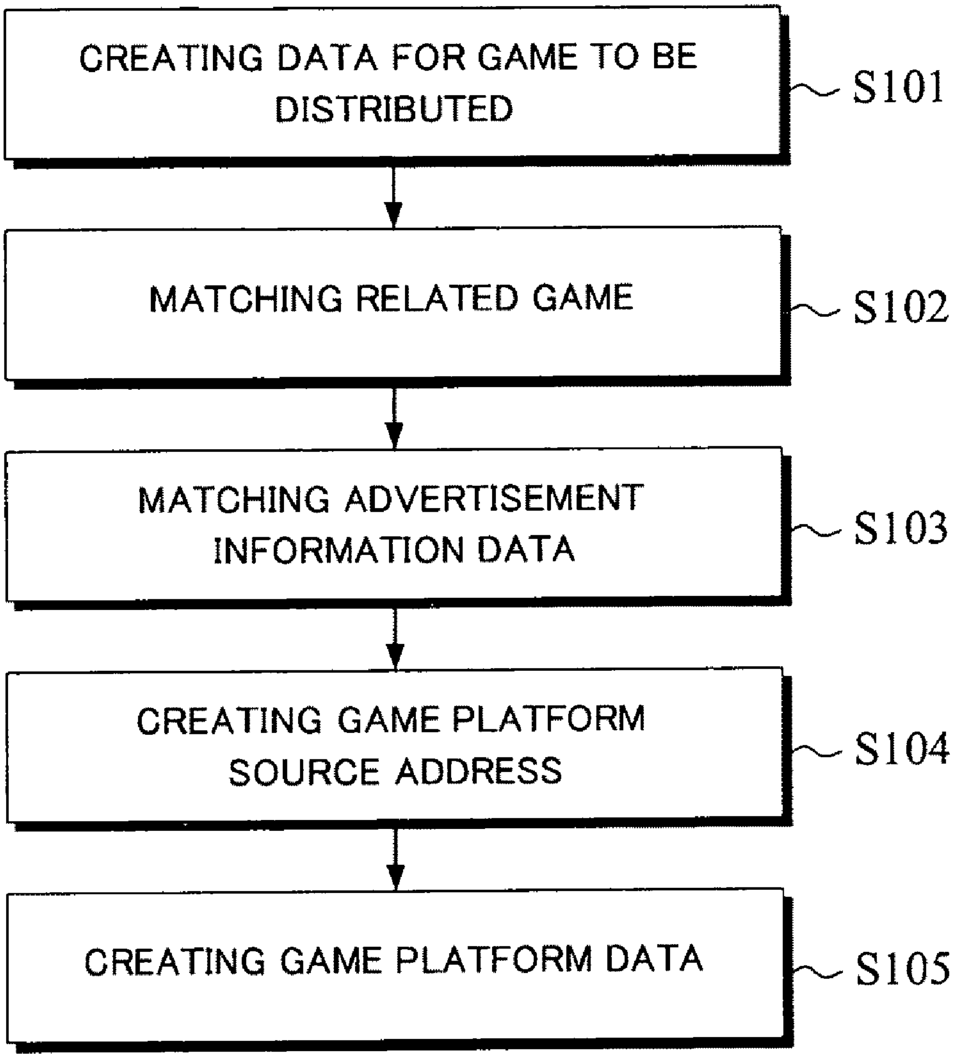
FIG. 8 is a flowchart showing a method for creating game platform data in accordance with an embodiment of the present invention.

Hereinafter, a process for creating game platform data will be described in detail with reference to FIG. 8.

In step S101, data for a game to be distributed are created. The data for the game to be distributed can be data of a trial version game which limits some functions of an original version game. However, data of the original version game can also be provided as the data for the game to be distributed.

In step S102, the game to be distributed and a related game are matched with each other. If the game to be distributed is the trial version game, the related game can be the original version game, or can be another game of a similar genre. In addition, it can be a current popular game or a recommended new game.

In step S103, advertisement information data to be inserted into a game platform is matched. The advertisement information may include an advertisement image and link information which are requested to be inserted into the game platform from an advertiser, and also may include the advertisement data of another service provided by an operator of the game providing system.

In step S104, game platform source address information is created. The game platform source address information corresponds to the loaded games to be distributed, respectively. Also, the game platform source address information is inserted as a part of game platform data, thereby supporting the game platform to be copied.

In step S105, the game platform data are created by combining a source address of the data for the game to be distributed, a related game link, advertisement information and data of the game platform source address. Then, the game platform data are stored in an accessible online space by using the game platform source address.

Figure 9:
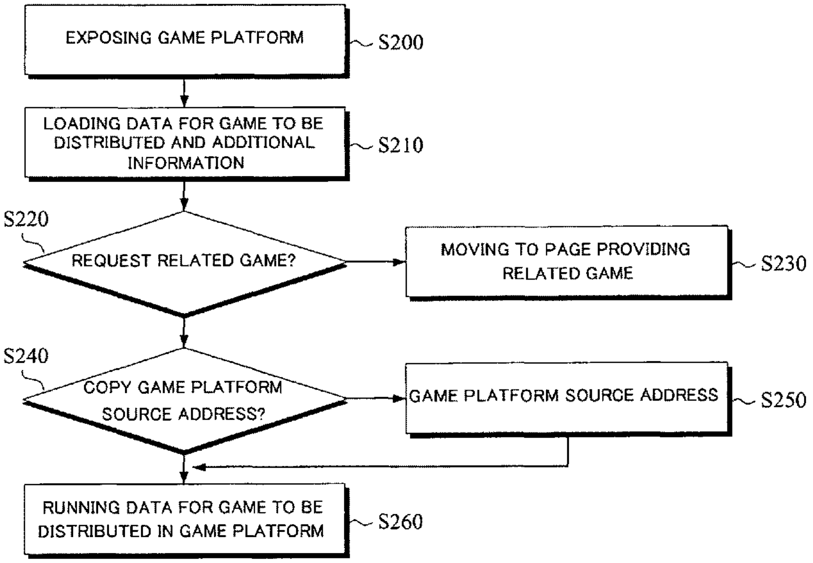
FIG. 9 is a flowchart showing a method for playing a game in accordance with an embodiment of the present invention.

FIG. 9 is a flowchart showing a method for playing a game in accordance with an embodiment of the present invention.

If a web page, in which a game platform is installed for a particular game, is opened, the game platform is exposed (step S200). The game platform is downloaded by using game platform source address information included in an html tag of the web page.

If the game platform is downloaded, a part of game platform data operates so that data for a game to be distributed and additional information are loaded (step S210). For example, link information of the data for the game to be distributed and the additional information, and an algorithm requesting them can be included in the part of the game platform file. Therefore, when the game platform is activated, the game platform operates as a web program so that the data for the game to be distributed and the additional information are downloaded and then loaded on the game platform.

In step S220, whether there is a request for a related game provided with a link to the game platform is determined. If there is the request for the related game, the game platform moves to a related game providing page (step S230). The related game providing page can be provided by activating a new web browser.

In step S240, whether there is a request for a copy of a game platform source address is determined. If there is the request for the copy of the game platform source address, source address information in which the game platform can be installed is copied to a client (step S250). The copied game platform source address information can be used for installing the game platform by using a common pasting command.

In step 260, the loaded game to be distributed is run according to a user's selection.

Although the operation in accordance with the embodiment shown in FIG. 9 is performed in a client device, it is apparent to those skilled in the art that the client can perform the operation as described above by a component of a computer providing system linked to the client device and a program provided to the client.

As discussed above, the present invention also provides a computer readable storage medium in which a program for providing a game is recorded, wherein the program includes instructions for performing the above-described methods. Also, there is provided a computer readable storage medium storing therein a data structure for a game platform supporting a distribution of a game, the data structure comprising: game platform skin data for designing an outer appearance of the game platform; source address data for a game to be distributed which is loaded on the game platform; related game link data for displaying link information of a game related to the game to be distributed; advertisement information data; and game platform source address information data.

It should be appreciated that embodiments of the present invention can be implemented in hardware, software, firmware, middleware or a combination thereof and utilized in systems, subsystems, components, or sub-components thereof. When implemented in software, the elements of the embodiments are the instructions/code segments to perform the necessary tasks. The program or code segments can be stored in a machine readable medium, such as a processor readable medium or a computer program product, or transmitted by a computer data signal embodied in a carrier wave, or a signal modulated by a carrier, over a transmission medium or communication link. The machine-readable medium or processor-readable medium may include any medium that can store or transfer information in a form readable and executable by a machine (e.g. a processor, a computer, and the like). As used in this application, the terms "unit" and "system" are intended to refer to a computer-related entity, either hardware, a combination of hardware and software, software, or software in execution. For example, a unit can be, but is not limited to being, a process running on a processor, a processor, a hard disk drive, multiple storage drives (of optical and/or magnetic storage medium), an object, an executable, a thread of execution, a program, and/or a computer. By way of illustration, both an application, running on a server and the server can be a unit. One or more units can reside within a process and/or thread of execution, and a unit can be localized on one computer and/or distributed between two or more computers.

The present invention provides various advantages including the following. Online games and/or related information and advertisement can be widely distributed while the source data of the games being secured. Also, the number of users can be increased in a short time.

The above description of the present invention is provided for the purpose of illustration, and it would be understood by those skilled in the art that various changes and modifications may be made without changing technical conception and essential features of the present invention. Thus, it is clear that the above-described embodiments are illustrative in all aspects and do not limit the present invention.

The scope of the present invention is defined by the following claims rather than by the detailed description of the embodiment. It shall be understood that all modifications and embodiments conceived from the meaning and scope of the claims and their equivalents are included in the scope of the present invention.

The terms "having" and "including" and similar terms as used in the foregoing specification are used in the sense of "optional" or "may include" and not as "required". Many changes, modifications, variations and other uses and applications of the present construction will, however, become apparent to those skilled in the art after considering the specification and the accompanying drawings. All such changes, modifications, variations and other uses and applications which do not depart from the spirit and scope of the invention are deemed to be covered by the invention which is limited only by the claims which follow. The scope of the disclosure is not intended to be limited to the embodiments shown herein, but is to be accorded the full scope consistent with the claims, wherein reference to an element in the singular is not intended to mean "one and only one" unless specifically so stated, but rather "one or more." All structural and functional equivalents to the elements of the various embodiments described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims.

What is claimed is:

1. A system for providing and distributing a game, the system comprising:

a game providing unit configured to provide at least one game content to a client;

a game platform unit configured to generate, by a processor, a game platform comprising data and a source address of the game platform, the data comprising game platform skin data, related game link data, advertisement information data, or any combination thereof, wherein the game platform skin data is configured to display the game platform associated with providing a copy function using a user interface, wherein a non-transitory storage medium is configured to store the data of the game platform; and a request unit configured to request the data of the game platform and in response to detection of activating the copy function associated with the user interface, the game platform is converted into a format allowing to copy the source address of the game platform, wherein the data is downloaded using the source address.

2. The system of claim 1, wherein the copy function further comprises allowing to copy a network address of the game platform via the game server or the game platform.

3. The system of claim 1, wherein the related game information or the advertisement information is updated associated with the game platform.

4. The system of claim 3, wherein the related game information comprises link information of a page for linking a game comprising a similar genre as the game to be distributed.

5. The system of claim 1, wherein the format allowing to copy the source address of the game platform comprises a URL (Uniform Resource Locator) address format or a Hypertext Markup Language (HTML) tag format.

6. The system of claim 5, wherein the game platform is configured to request data of the game to be distributed in response to detection of a document including the HTML tag being activated on a web.

7. The system of claim 1, wherein the game platform is configured to provide a network address of the game platform to be copied on the web where the game platform is activated.

8. A method for providing and distributing a game, the method comprising:

creating a game platform;

loading data comprising at least one of source address data of the game platform, one or more game data to be distributed, related game data, or advertisement data into the game platform;

providing a copy function to copy the data associated with the game platform by generating a user interface, wherein the game platform is converted into a format allowing to copy the source address of the game platform;

downloading the data in response to receiving a request for the game platform using the source address information of the game platform; and activating the loaded data in response to detection of a selection of the downloaded data using the user interface.

9. The method of claim 8, further comprising:

creating data for the game to be distributed;

matching the game to be distributed with the related game data;

matching the game to be distributed with the advertisement data;

creating the source address data of the game platform; and creating the game platform data comprising at least one of game platform skin data, source address data for game to be distributed, related game link data, advertisement information data, or game platform source address information data.

10. The method of claim 9, wherein the related game data comprises at least one of a game data having a similar genre as the game data to be distributed, a recommended game data or a popular game data.

11. The method of claim 8, wherein the game platform comprises link information of the related game data.

12. The method of claim 8 further comprising:

providing a page comprising the related game data in response to detection of a request for the related game data.

13. A non-transitory computer readable storage medium comprising a computer executable program, executed by a processor to perform the steps of claim 8.

14. A non-transitory computer readable storage medium comprising a computer executable program, executed by a processor to perform the steps of claim 9.

15. A server comprising non-transitory computer readable storage medium comprising a data structure for a game platform, executed by a processor, for providing and distributing a game, the server comprising:

game platform being generated by the processor, the game platform comprising data and a source address of the game platform, the source address configured for a game to be distributed which is loaded on the game platform, the data comprising game platform skin data configured to design an outer appearance of the game platform and to display the game platform associated with providing a copy function using a user interface, and the game platform further comprising:

related game link data configured to display link information of a game related to the game to be distributed; and advertisement information data;

wherein in response to detection of activating the copy function associated with the user interface, the game platform is converted into a format allowing to copy the source address of the game platform, wherein the data is downloaded using the source address.

16. The server of claim 15, wherein the data of the game platform is generated by using Flash software.

17. The server of claim 15, wherein the source address of the game platform to be distributed is designed by using Flash software.

18. The server of claim 15, wherein the source address of the game platform is formed by using an html tag.

* * * * *